United States Patent
Matthews

(10) Patent No.: US 9,327,712 B2
(45) Date of Patent: May 3, 2016

(54) SYSTEM AND METHOD FOR CONTROL OF A HYBRID VEHICLE WITH REGENERATIVE BRAKING USING LOCATION AWARENESS

(71) Applicant: Alcatel-Lucent USA Inc., Murray Hill, NJ (US)

(72) Inventor: Kim N. Matthews, Warren, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/258,207

(22) Filed: Apr. 22, 2014

(65) Prior Publication Data
US 2015/0298680 A1   Oct. 22, 2015

(51) Int. Cl.
| | | |
|---|---|---|
| *B60W 10/08* | (2006.01) | |
| *B60W 20/00* | (2016.01) | |
| *B60W 10/18* | (2012.01) | |
| *B60W 40/06* | (2012.01) | |
| *B60W 10/06* | (2006.01) | |
| *B60W 30/18* | (2012.01) | |

(52) U.S. Cl.
CPC ............... *B60W 20/00* (2013.01); *B60W 10/06* (2013.01); *B60W 10/08* (2013.01); *B60W 10/18* (2013.01); *B60W 30/18127* (2013.01); *B60W 40/06* (2013.01); *Y10S 903/93* (2013.01)

(58) Field of Classification Search
None
See application file for complete search history.

(56) References Cited

U.S. PATENT DOCUMENTS

| | | | | |
|---|---|---|---|---|
| 6,507,127 B1* | 1/2003 | Amano | ................. | B60L 11/123 290/40 A |
| 7,360,615 B2* | 4/2008 | Salman | .................... | B60K 6/52 180/65.265 |
| 7,539,562 B2* | 5/2009 | Maguire | ................... | B60K 6/48 180/65.8 |
| 7,849,944 B2* | 12/2010 | DeVault | ................. | B60K 6/365 180/65.265 |
| 8,423,273 B2* | 4/2013 | Mineta | ................ | B60W 20/102 701/123 |
| 8,527,132 B2* | 9/2013 | Mineta | ................... | B60W 20/00 700/291 |
| 8,548,660 B2* | 10/2013 | Thai-Tang | ............ | B60W 10/08 700/291 |
| 8,565,952 B2* | 10/2013 | Mehr | ..................... | B60L 11/00 180/65.265 |
| 8,606,513 B2* | 12/2013 | Chen | ................... | B60W 20/104 701/22 |
| 8,612,082 B2* | 12/2013 | Hashimoto | ........ | G01C 21/3469 701/1 |
| 8,751,087 B1* | 6/2014 | Dufford | .............. | B60W 20/108 180/65.23 |
| 8,855,844 B2* | 10/2014 | Schwindt | ........... | B60K 31/0008 701/22 |
| 8,862,374 B2* | 10/2014 | Maura | ................ | G01C 21/3697 701/123 |

(Continued)

*Primary Examiner* — Jonathan M Dager
(74) *Attorney, Agent, or Firm* — Loza & Loza, LLP

(57) ABSTRACT

A hybrid vehicle includes a location awareness module that determines an energy profile for a portion of a roadway or for a known route. The energy profile includes one or more measurements of regenerative braking operations for predicted braking events. The hybrid vehicle determines an efficient use of an electric motor and generator (EMG) based on the energy profile of the roadway portion or the route. When the energy profile includes a predicted braking event, the hybrid vehicle determines to engage the EMG to discharge the battery system prior to the regenerative braking operation for the predicted braking event.

12 Claims, 7 Drawing Sheets

(56) References Cited

U.S. PATENT DOCUMENTS

| | | | |
|---|---|---|---|
| 8,918,240 B2 * | 12/2014 | Manickaraj | B60W 20/00 180/65.8 |
| 8,942,919 B2 * | 1/2015 | Uyeki | G01C 21/3469 701/22 |
| 8,963,365 B2 * | 2/2015 | King | B60L 11/1857 174/255 |
| 9,067,589 B1 * | 6/2015 | Zhao | B60W 20/104 |
| 2002/0188387 A1 * | 12/2002 | Woestman | B60K 6/365 701/22 |
| 2003/0015874 A1 * | 1/2003 | Abe | B60K 6/48 290/40 C |
| 2004/0074682 A1 * | 4/2004 | Fussey | B60K 6/12 180/65.21 |
| 2005/0228553 A1 * | 10/2005 | Tryon | B60K 6/46 701/22 |
| 2006/0005736 A1 * | 1/2006 | Kumar | B60L 11/1801 105/1.4 |
| 2006/0005739 A1 * | 1/2006 | Kumar | B60L 7/06 105/35 |
| 2006/0278449 A1 * | 12/2006 | Torre-Bueno | B60K 6/46 180/65.29 |
| 2007/0010933 A1 * | 1/2007 | Hochkirchen | B60W 10/26 701/117 |
| 2007/0112475 A1 * | 5/2007 | Koebler | B60L 3/12 701/1 |
| 2008/0119982 A1 * | 5/2008 | Yamada | B60L 3/12 701/33.4 |
| 2008/0262668 A1 * | 10/2008 | Yamada | B60K 6/46 701/22 |
| 2008/0288132 A1 * | 11/2008 | King | B60L 11/123 701/22 |
| 2008/0319596 A1 * | 12/2008 | Yamada | B60K 6/442 701/22 |
| 2008/0319597 A1 * | 12/2008 | Yamada | B60K 6/46 701/22 |
| 2009/0198398 A1 * | 8/2009 | Yamada | B60K 6/46 701/22 |
| 2009/0259363 A1 * | 10/2009 | Li | B60K 6/445 701/36 |
| 2010/0121514 A1 * | 5/2010 | Kato | B60K 6/48 701/22 |
| 2010/0131139 A1 * | 5/2010 | Sakai | B60K 6/46 701/22 |
| 2010/0161166 A1 * | 6/2010 | Yamada | B60K 6/46 701/22 |
| 2010/0179714 A1 * | 7/2010 | Tani | B60K 6/445 701/22 |
| 2010/0185384 A1 * | 7/2010 | Naito | G01C 21/26 701/532 |
| 2010/0235025 A1 * | 9/2010 | Richter | B60L 11/1824 701/22 |
| 2010/0235030 A1 * | 9/2010 | Xue | B60L 7/12 701/22 |
| 2010/0286908 A1 * | 11/2010 | Tate, Jr. | G01C 21/3469 701/533 |
| 2010/0286909 A1 * | 11/2010 | Tate, Jr. | G01C 21/3446 701/533 |
| 2010/0305799 A1 * | 12/2010 | Yamada | B60K 6/46 701/22 |
| 2011/0040438 A1 * | 2/2011 | Kluge | G01C 21/3469 701/31.4 |
| 2011/0066308 A1 * | 3/2011 | Yang | B60W 10/06 701/22 |
| 2011/0077857 A1 * | 3/2011 | Ramaswamy | G01C 21/3469 701/465 |
| 2011/0172867 A1 * | 7/2011 | Yu | B60K 6/445 701/22 |
| 2011/0184622 A1 * | 7/2011 | Yamada | B60K 6/46 701/99 |
| 2011/0184642 A1 * | 7/2011 | Rotz | G01C 21/3492 701/533 |
| 2011/0238457 A1 * | 9/2011 | Mason | G01C 21/3469 705/7.14 |
| 2011/0241905 A1 * | 10/2011 | Niwa | G01C 21/3682 340/995.1 |
| 2011/0276209 A1 * | 11/2011 | Suganuma | B60W 10/06 701/22 |
| 2011/0288712 A1 * | 11/2011 | Wang | B60K 6/445 701/22 |
| 2011/0307166 A1 * | 12/2011 | Hiestermann | G01C 21/32 701/119 |
| 2012/0010767 A1 * | 1/2012 | Phillips | G01C 21/3469 701/22 |
| 2012/0053772 A1 * | 3/2012 | Lu | B60L 15/2045 701/22 |
| 2012/0109508 A1 * | 5/2012 | Rothschild | G01C 21/3484 701/400 |
| 2012/0158299 A1 * | 6/2012 | Cerecke | G01C 21/3446 701/533 |
| 2013/0006458 A1 * | 1/2013 | Bhattarai | B60W 50/082 701/22 |
| 2013/0024055 A1 * | 1/2013 | Hysko, Jr. | B60W 50/0097 701/22 |
| 2013/0079962 A1 * | 3/2013 | Ishikawa | B60L 15/2045 701/22 |
| 2013/0085651 A1 * | 4/2013 | Johannsson | B60W 30/143 701/93 |
| 2013/0116870 A1 * | 5/2013 | Harty | B60W 10/06 701/22 |
| 2013/0332020 A1 * | 12/2013 | Uchihara | B60K 6/48 701/22 |
| 2014/0032087 A1 * | 1/2014 | Shiri | G06F 17/00 701/117 |
| 2014/0046595 A1 * | 2/2014 | Segawa | G01C 21/34 701/541 |
| 2014/0052374 A1 * | 2/2014 | Hoch | G01C 21/343 701/533 |
| 2014/0316618 A1 * | 10/2014 | Matthews, Jr. | B60L 15/38 701/19 |
| 2015/0039169 A1 * | 2/2015 | Dextreit | B60W 50/0097 701/22 |
| 2015/0046000 A1 * | 2/2015 | Zhao | B60K 6/445 701/22 |
| 2015/0046132 A1 * | 2/2015 | Papajewski | B60W 50/0097 703/2 |
| 2015/0066270 A1 * | 3/2015 | Ogawa | B60W 20/104 701/22 |
| 2015/0088414 A1 * | 3/2015 | Mason | G01C 21/3469 701/423 |

* cited by examiner

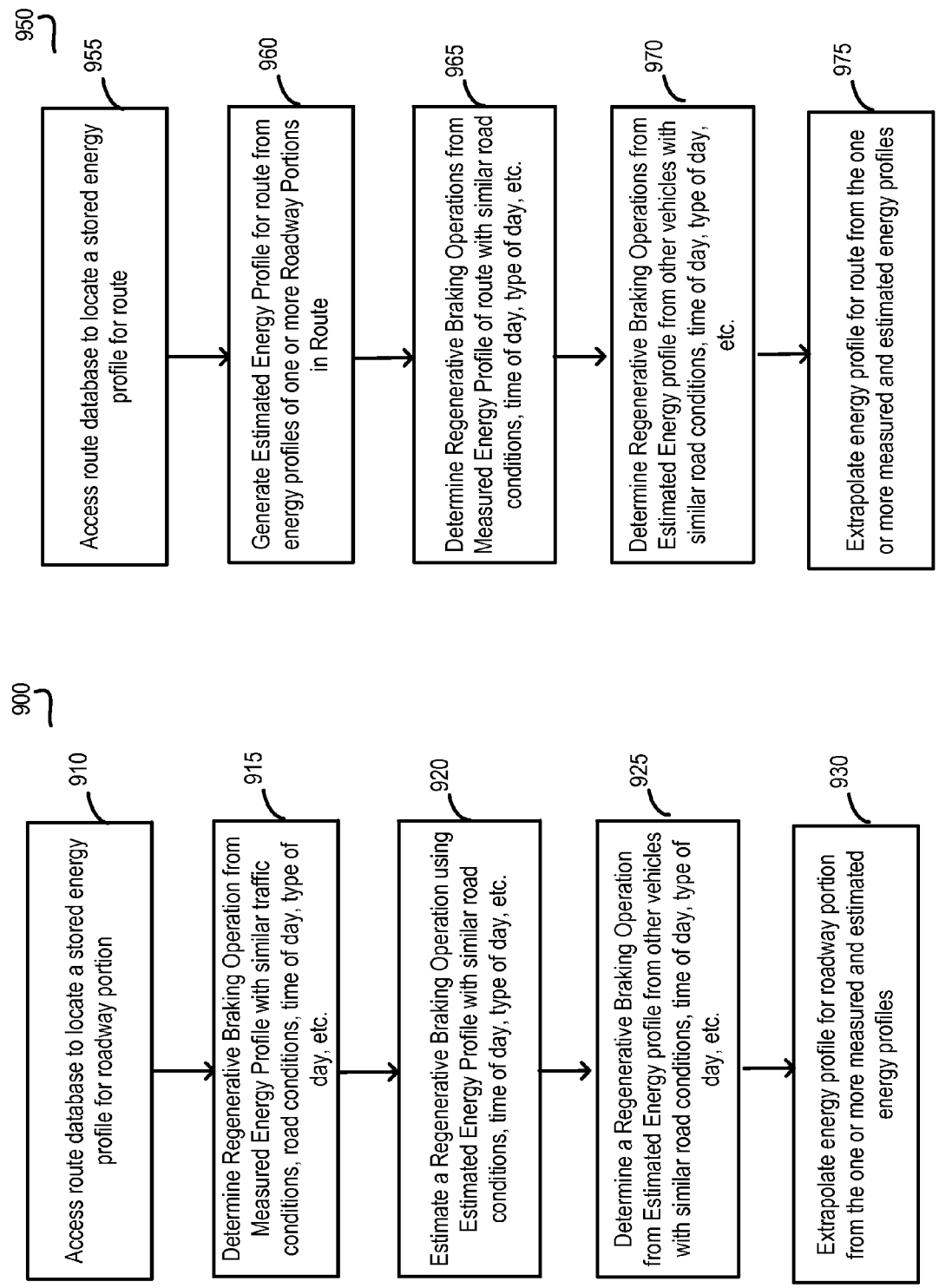

SYSTEM AND METHOD FOR CONTROL OF A HYBRID VEHICLE WITH REGENERATIVE BRAKING USING LOCATION AWARENESS

CROSS-REFERENCE TO RELATED PATENTS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to hybrid vehicles and in particular to systems and methods for regenerative braking in hybrid vehicles.

2. Description of Related Art

This section describes related art, and accordingly, the statements in this section are not admissions of prior art.

Fuel efficiency is a personal, national and global issue. A significant portion of energy consumption is the use of gasoline in cars which has resulted in a movement towards hybrid technologies to improve efficiency.

Certain types of hybrid vehicles use both an electric motor and an internal combustion engine. These types of hybrid vehicles combine the driving range of the internal combustion engine with the fuel efficiency and emissions-free characteristics of the electric motor. The electric motor is powered by a battery system with a limited storage capacity.

For such hybrid electrical vehicles, ifs important that the battery system remain charged as long as possible. When the hybrid vehicle battery loses its charge, the internal combustion engine is entirely responsible for powering the vehicle. At that point, the hybrid vehicle loses the fuel efficiency and emissions-free characteristics of the electric motor.

To extend the charge of its battery, hybrid vehicles may employ regenerative braking systems. In regenerative braking systems, for example, when the brakes are applied, the electric motor reverses direction. The torque created by this reversal counteracts the forward momentum and eventually stops the hybrid vehicle. When the electric motor reverses direction during braking, it also becomes an electric generator. The electricity generated during braking is used to recharge the battery in the battery system powering the electric motor. Regenerative braking is thus able to recoup some of the energy produced during the braking process, and this energy is used to recharge the battery that powers the electric motor.

Overall fuel efficiency of a hybrid vehicle may be increased through improved control of the regenerative breaking system and thus extending the use of the electric motor.

SUMMARY

In an embodiment, a hybrid vehicle comprises an internal combustion engine and an electric motor and generator powered by a battery system, wherein the electric motor and generator is operable to perform a regenerative braking operation to recharge the battery system. The hybrid vehicle also comprises at least one processing module operable to determine a roadway portion and an energy profile for the roadway portion; determine a predicted regenerative braking operation using the energy profile; and determine use of the electric motor and generator prior to the predicted regenerative braking operation.

In another embodiment, a hybrid vehicle comprises an internal combustion engine and an electric motor and generator powered by a battery system, wherein the electric motor and generator is operable to perform a regenerative braking operation to recharge the battery system. The hybrid vehicle also comprises at least one processing module operable to: determine a route of the hybrid vehicle and an energy profile for the route; determine one or more predicted regenerative braking operations using the energy profile for the route; and determine use of the electric motor and generator prior to the one or more predicted regenerative braking operations.

In still another embodiment, a method for controlling a hybrid vehicle comprises powering an electric motor and generator by a battery system and recharging the battery system using a regenerative braking operation by the electric motor and generator. The method also comprises determining a relative use of the electric motor and generator and an internal combustion engine to power the hybrid vehicle by: determining a roadway portion being traveled by the hybrid vehicle and an energy profile for the roadway portion; determining a predicted regenerative braking operation along the roadway portion using the energy profile; and determining to use the electric motor and generator to power the hybrid vehicle prior to the predicted regenerative braking operation.

In some embodiments of any of the above apparatus/methods, the at least one processing module is further operable to estimate a charge to be generated by the predicted regenerative braking operation and determine a duration of use of the electric motor and generator to discharge the battery system prior to the predicted regenerative braking operation based on the estimated charge.

In some embodiments of any of the above apparatus/methods, the at least one processing module is further operable to engage the electric motor and generator to power the hybrid vehicle and to discharge the battery system in an amount equal to or more than the estimated charge.

In some embodiments of any of the above apparatus/methods, the at least one processing module is operable to determine the predicted regenerative braking operation using the energy profile by accessing a measured energy profile of the roadway portion, wherein the measured energy profile of the roadway portion includes measured location information for a detected braking event and energy measurements for a regenerative braking operation during the detected braking event.

In some embodiments of any of the above apparatus/methods, the at least one processing module is operable to determine the predicted regenerative braking operation using the energy profile by accessing an estimated energy profile of the roadway portion, wherein the estimated energy profile of the roadway portion includes location information for a predicted braking event and estimated energy measurements for a regenerative braking operation during the predicted braking event.

In some embodiments of any of the above apparatus/methods, the at least one processing module is operable to determine the predicted regenerative braking operation using the energy profile by accessing a measured energy profile of the roadway portion from one or more other vehicles, wherein the measured energy profile includes location information for a detected braking event and energy measurements for a regenerative braking operation during the detected braking event from the one or more other vehicles.

In some embodiments of any of the above apparatus/methods, the at least one processing module is operable to determine the predicted regenerative braking operation using the energy profile by determining a predicted braking event using location information and calculating energy measurements for the predicted regenerative braking operation during the predicted braking event.

In some embodiments of any of the above apparatus/methods, the at least one processing module is further operable to estimate a charge to be generated by the one or more predicted regenerative braking operations using the energy profile for the route; and determine a duration of use of the electric motor and generator based on the estimated charge and engage the electric motor and generator to power the hybrid vehicle for the determined duration prior to the one or more predicted regenerative braking operations along the route.

In some embodiments of any of the above apparatus/methods, at least one processing module is further operable to estimate a charge to be generated by the one or more predicted regenerative braking operations using the energy profile for the route; and engage the electric motor and generator to power the hybrid vehicle and to discharge the battery system in an amount equal to or more than the estimated charge prior to the one or more predicted regenerative braking operations.

In some embodiments of any of the above apparatus/methods, the at least one processing module is operable to determine the one or more predicted regenerative braking operations using the energy profile for the route by accessing a measured energy profile of the route, wherein the measured energy profile of the route includes energy measurements for the one or more regenerative braking operations and location information for one or more detected braking events corresponding to the one or more regenerative braking operations.

In some embodiments of any of the above apparatus/methods, the at least one processing module is operable to determine the one or more predicted regenerative braking operations using the energy profile for the route by accessing an estimated energy profile of the route, wherein the estimated energy profile of the route includes location information for one or more predicted braking events and estimated energy measurements for the one or more regenerative braking operations corresponding to the one or more predicted braking events.

In some embodiments of any of the above apparatus/methods, the at least one processing module is operable to determine the one or more predicted regenerative braking operations using the energy profile for the route by determining one or more roadway portions along the route; accessing energy profiles corresponding to the one or more roadway portions; and determining the one or more predicted regenerative braking operations from the energy profiles corresponding to the one or more roadway portions.

In some embodiments of any of the above apparatus/methods, the at least one processing module is further operable to determine a total measured energy generation and a total measured energy expenditures for the route from the energy profile for the route.

BRIEF DESCRIPTION OF THE DRAWINGS

Some embodiments of apparatus and/or methods are now described, by way of example only, and with reference to the accompanying drawings, in which:

FIG. 9 illustrates a logical flow diagram of an embodiment of a method for determining an energy profile;

FIG. 10 illustrates a logical flow diagram of another embodiment of a method for determining an energy profile.

DETAILED DESCRIPTION OF ILLUSTRATIVE EMBODIMENTS

Figure 1:
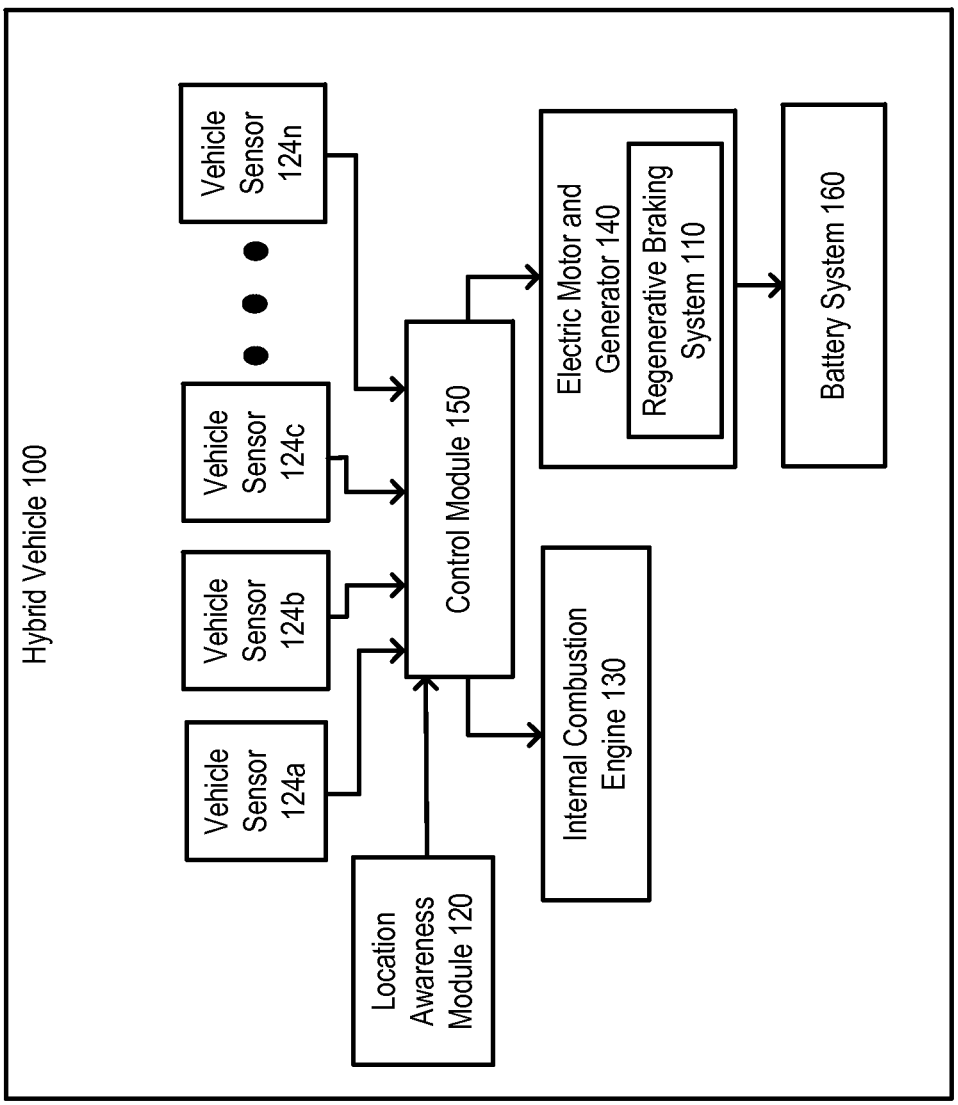
FIG. 1 illustrates a schematic block diagram of an embodiment of a hybrid vehicle with a regenerative braking system.

FIG. 1 illustrates a schematic block diagram of an embodiment of a hybrid vehicle 100. In an embodiment, the hybrid vehicle 100 includes an internal combustion engine 130 and an electric motor and generator (EMG) 140. A battery system 160 powers the EMG 140 and may include, e.g., one or more batteries, a charging system and sensors. A control module 150 controls the relative operation of the internal combustion engine 130 and the electric engine 140 to provide power to the hybrid vehicle 100. The control module 150 is operable to control other components of the hybrid vehicle 100, such as the regenerative braking system 110 and battery system 160. The control module 150 may include any number of controllers, and may be integrated into a single controller, or have various separate controllers. For example, the control module 150 may include separate brake controllers, transmission controllers, engine controllers, etc. Some or all of the controllers may be operably connected by a network or other means.

In an embodiment, the hybrid vehicle 100 is a parallel hybrid vehicle wherein both the internal combustion engine 130 and the EMG 140 are operable to power a transmission of the hybrid vehicle 100 alternatively or in combination. The transmission then turns the wheels. The fuel tank and internal combustion engine 130 connect to the transmission while the battery system 160 and EMG 140 also connect to the transmission independently. As a result, in a parallel hybrid vehicle, both the EMG 140 and the internal combustion engine 130 are operable provide propulsion power to the hybrid vehicle independently or in combination.

The control module 150 controls the operation of the internal combustion engine 130 and the EMG 140 and may determine to operate both engines at a same power or allocate different power output from one or the other or operate one independently and not the other. The manner to divide power and use between the internal combustion engine 130 and the EMG 140 may differ depending on the hybrid vehicle, the speed, horsepower required, acceleration rate, etc. For example, when the hybrid vehicle is at high speeds, traveling a steep incline or a quick acceleration, the internal combustion engine 130 may provide all or most of the power while the EMG 140 may only provide additional power. However, when the hybrid vehicle 100 is at lower speeds or in stop and go traffic, the EMG 140 may provide all or more power to propel the hybrid vehicle 100.

In an embodiment, hybrid vehicle 100 includes an electronic throttle control system. When the throttle pedal is pushed, a signal is sent to the control module 150, which further activates a relay in the controller that will send battery current through an inverter/converter to the EMG 140 causing the hybrid vehicle 100 to move. The harder the pedal is pushed, the more current flows from the battery system 160 to the EMG 140, and the faster the hybrid vehicle 100 goes. Depending upon load, battery state-of-charge and the design of the hybrid drivetrain, a heavy throttle will also activate the internal combustion engine 130 for more power. Conversely, lifting slightly on the throttle will decrease current flow to the EMG 140 and the hybrid vehicle will slow down. Lifting further or completely off the throttle or activating a brake will cause the current to switch direction—moving the EMG 140 from a motor mode to a generator mode—and begin a regenerative braking process. The EMG 140 is thus operable as both an electric motor, e.g., to provide torque to propel the hybrid vehicle 100, and as a generator, receiving torque from the electric engine 140 and/or vehicle wheels to generate electrical power and charge battery system 160.

The internal combustion engine 130 may be a direct injection engine, or alternatively, the internal combustion engine 130 may be another type of engine, such as a port injection engine, a fuel cell, or other type of engine. The internal combustion engine 130 may use various types of fuel sources, such as gasoline, diesel, biofuel, natural gas, hydrogen, or a combination of one or more types of fuel sources.

The control module 150 is in communication with a plurality of vehicle sensors 124a-n for detecting the operating conditions of the hybrid vehicle 100. The plurality of sensors may include for example, throttle position sensors, mass air flow sensors, oxygen sensors, manifold pressure sensors, brake pedal sensors, accelerator pedal sensors, speed sensors, battery charge sensors, battery capacity sensors or any other sensors for determining driver input and operating conditions of the hybrid vehicle 100.

The control module 110 is operable to control the regenerative braking system 110 to provide braking during a braking request, such as from an operator of the vehicle. A braking request may include depressing a brake pedal, or merely releasing a throttle, such as the accelerator pedal. In addition, to the regenerative braking system 110, the hybrid vehicle 100 may have other braking systems, such a friction brakes. For example, the control module 150 may control and operate friction brakes for mechanical braking of the wheels, e.g. at higher speeds or rapid decelerations while controlling the regenerative braking system 110 to brake the hybrid vehicle 100 at lower speeds or for slower decelerations. As discussed above, when the regenerative braking system 110 provides braking of the hybrid vehicle 100, the regenerative braking system 110 creates negative torque to slow the hybrid vehicle 100. This negative torque generates electric energy (e.g. charge (Q) or current (I)) which is transferred to the battery system 160. The electric engine 140 thus functions as a generator that generates electric energy for charging the battery system 160 during a braking event. This generation of electric energy for charging the battery system 160 is known as a regenerative braking operation.

The capacity (e.g., Watt-hours) of the battery system 160 is one measure of how much energy is stored in the battery system 160. The capacity of the battery system 160 generally has a maximum predetermined threshold, also called a rating capacity. Regenerative braking operations may be limited by the capacity of the battery system 160. For example, during a braking event, the battery system 160 may be charged to the maximum predetermined threshold of capacity and cannot accept any additional energy without a risk of overcharging and damaging the battery. Regenerative braking operations must then be avoided during the braking event. Thus, when a capacity of the battery system 160 is at or above the maximum predetermined threshold of capacity, the hybrid vehicle 100 cannot take advantage of a braking event to perform a regenerative braking operation to recharge the battery system 160.

This inability to charge the battery system 160 during a braking event is suboptimal and may be improved through location awareness. For example, suppose a hybrid vehicle 100 travels along a long flat road followed by a long descending hill. The control module 150 may determine while traveling on the flat portion of the road that the electric motor will contribute no (or little) power even though the battery system 160 is at or above the maximum predetermined threshold of capacity and able to generate power to the EMG 140. When the hybrid vehicle 100 reaches the hill, the battery system 160 is still at the maximum predetermined threshold of capacity and regenerative breaking is not engaged. The hybrid vehicle 100 will not benefit from the braking event for charging the battery system 160. No electrical energy will be recovered during the braking event during the decent of the hill.

In an embodiment herein, the hybrid vehicle 100 includes a location awareness module 120 to improve efficiency in use of the EMG 140 and regenerative braking. The location awareness module 120 provides a predicted regenerative braking operation to the control module 150, e.g., based on global positioning satellite (GPS) technology and/or topological data and/or road maps and/or commonly traveled routes and/or traffic data, as further described herein. The predicted regenerative braking operation includes a potential future braking event, such as hills, stoplights, stop signs, intersections, traffic, etc., that would provide an opportunity for a regenerative braking operation. Using the predicted regenerative braking operation, the control module 150 determines to engage the EMG 140 to discharge the battery system 160 prior to the predicted braking event. The hybrid vehicle 100 may then be able to take advantage of the regenerative braking operation to recharge the battery system 160 during the braking event.

For example, in the above scenario wherein the hybrid vehicle 100 travels along a long flat road followed by a long descending hill, the location awareness module 120 provides information to the control module 150 of a predicted braking event of the long descending hill. The information may include a distance to the hill, an incline angle of the hill, distance of the hill, or other topographical information about the hill. In response to this information, the control module 150 may then determine to utilize the EMG 140 during the long flat road to discharge the battery system 160 and so then be able to take advantage of the regenerative braking operation during the long descending hill.

In an embodiment, the control module 150 determines an estimated battery charge generated by a predicted regenerative braking operation, e.g., due to a future potential braking event such as a hill or intersection. The estimated battery charge is an estimate of the electrical energy (e.g., measured in total power or total current or voltage or charging rate) that will be generated to recharge the battery system 160 during the predicted regenerative braking operation. Alternatively, the control module determines battery charging and discharging rates (often referred to as a "C" rate of current). Based on the estimated battery charge during the predicted regenerative braking operation, the control module 150 then determines usage of the EMG 140 prior to the predicted regenerative braking operation. For example, the control module 150 may determine from the discharge rate of the battery system 160 a duration to engage the EMG 140 to discharge the battery system 160 sufficiently to take advantage of the predicted regenerative braking event. To take full advantage of the predicted regenerative braking event, battery discharge should equal or be more than the predicted battery charge during the predicted regenerative braking operation. Thus, the hybrid vehicle 100 is able to use the location awareness module to predict regenerative braking operations for charging the battery system 160 and so be able to more fully utilize the EMG 140 prior to such predicted regenerative braking operations.

The location awareness module 120 enables the control module 150 to more efficiently use the EMG 140 and regenerative braking operations to charge the battery system 160. Increasing the regenerative braking operation has many possible advantages, including further reducing wear on the friction wheel brakes, increasing vehicle fuel efficiency, increasing battery charging and decreasing vehicle emissions. Increasing the regenerative braking operation also leads to increased used of the EMG 140 which decreases emissions of the ICE 130. It also decreases use and cost of electricity from any type of plug-in recharging of the battery system 160.

Figure 2:
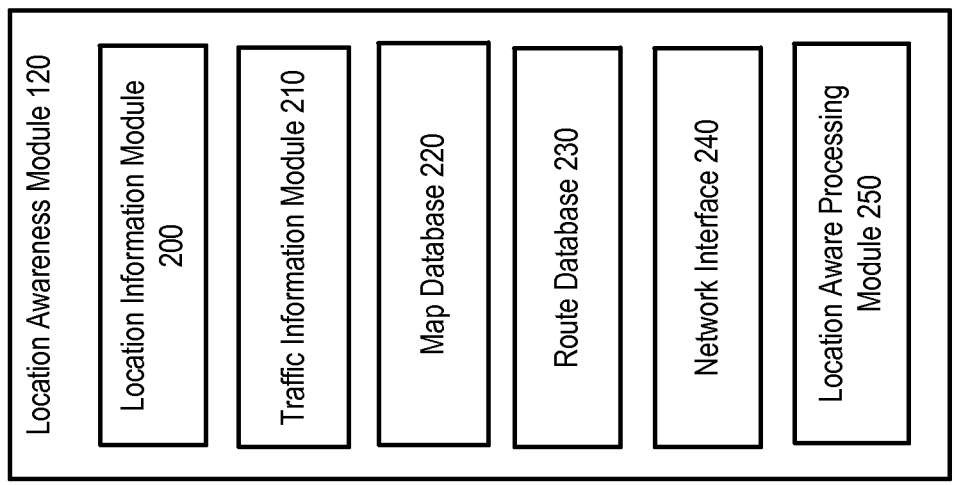
FIG. 2 illustrates a schematic block diagram of an embodiment of a location awareness module.

FIG. 2 illustrates a schematic block diagram of an embodiment of the location awareness module 120. The location awareness module 120 includes as an example, a location information module 200, a traffic information module 210, map database 220, route database 230, network interface 240 and location aware processing module 250. One or more of these components of the location awareness module 120 may be combined or incorporated into one or more modules or separated into different or comparable modules, databases or components or may be located externally to the location awareness module 120 in other modules, databases or components of the hybrid vehicle 100. Similarly, one or more of the various functions described herein performed by the location awareness module 120 or one or more of the components of the location awareness module 120 may be performed by one or more different or comparable modules, databases or components of the location awareness module 120 or may be performed by other modules, databases or components of the hybrid vehicle 100 located externally to the location awareness module 120.

In an embodiment, the location information module 200 of the location awareness module 120 provides current location information of the hybrid vehicle 100. The location information module 200 for example receives communications through the network interface 240 from a GPS system incorporated in the hybrid vehicle 100 or from an external GPS system or from a navigation system or device, smart phone or other device with GPS capability. Other means, such as cellular triangulation, may also be employed to determine current location information of the hybrid vehicle 100 by the location information module 200. The current location information includes GPS coordinates, longitude/latitude coordinates, geographical position with respect to a roadway, or other types of location information.

The traffic information module 210 provides traffic information for roadways in a geographic area around the current location of the hybrid vehicle 100. The traffic information includes, e.g., current average traffic speeds, generalized traffic ratings, such as red, yellow, green traffic ratings, current average time to a destination, construction information, accident information, weather information (such as rain, snow, sleet), etc. The traffic information module 200 receives communications through the network interface 240 from one or more services, such as a traffic service, navigation service, weather service, GPS system or other source. The traffic information module 200 may also receive information from one or more of the vehicle sensors 124a-n to determine current traffic information. For example, the traffic information module 210 may receive information from an outside temperature sensor, precipitation gauge, braking sensor, speed sensor, etc. of the hybrid vehicle 100. Based on these various sources of information, the traffic information module 200 determines current traffic information of roadways in a geographic area around the current location of the hybrid vehicle 100.

The location awareness module 120 also includes a map database 220 and route database 230. The map database 220 and route database 230 may include separate databases each comprising one or more non-transitory memory devices or may be combined into a single database including one or more non-transitory memory devices. The location database stores various maps of one or more geographical regions. The geographical regions include a geographical region around the current location of the hybrid vehicle 100 as well as other regions wherein the hybrid vehicle 100 has previously been located or geographical regions requested by an operator of the hybrid vehicle 100. The maps include roadway information for the geographical regions. The roadway information includes identification of roadways, such as interstates, highways, streets, drives, avenues, bridges, etc., as well as highway exits, tollbooths, intersections, stoplights, stop signs, speed bumps, railroad crossings, etc. The roadway information may also include posted speed limits.

In an embodiment, the route database 230 stores energy profiles for a plurality of roadway portions. The energy profile corresponding to a roadway portion may include an estimated energy profile or a measured energy profile. In an embodiment, an estimated energy profile is a projected or estimated amount of energy generated or dissipated by the battery system 160 over the roadway portion. The estimated energy profile may include, e.g. the battery charge and discharge rates or increase and decrease in battery capacity, for the portion of the roadway. For example, the route database 230 may store an estimated energy profile for a portion of a roadway from a first intersection or other first geographical point along the roadway to a second intersection or other second geographical point along the roadway. The estimated energy profile may be based on posted speed limits and roadway information, such as highway exits, tollbooths, intersections, stoplights, stop signs, speed bumps, railroad crossings, etc., along the portion of the roadway.

The route database 230 may also store estimated energy profiles for a route between a starting point and a destination, such as between a home and school. The estimated energy profile for the route is based on posted speed limits and topology information of the various roadway portions in the route, such as highway exits, tollbooths, intersections, stoplights, stop signs, speed bumps, railroad crossings, etc. along the route.

In an embodiment, the energy profile for a roadway portion may also include a measured energy profile. For example, as the hybrid vehicle 100 travels a portion of the roadway, the route database 230 stores actual measurements for a portion of the roadway. The measurements in the measured energy profile may include the battery charge and discharge rates or increase and decrease in battery capacity along the portion of the roadway. The route database 230 may also store time of day and type of day (weekend, weekday, holiday) that the actual measurements are made. The route database 230 may also store additional information on potential braking events along the roadway, such as number of braking events, torque generated during braking events, etc. The route database 230 also stores information for measured regenerative braking operations along the roadway. For example, when the hybrid vehicle 100 engages in a regenerative braking operation along the roadway, e.g. at a stop sign or stoplight or speed bump along the roadway, measurements relating to the regenerative braking operation are recorded in the energy profile in the route database. For example, measurements relating to the regenerative braking operation include battery charge generated and/or charge rate. Based on the energy profile, the location awareness module 120 may then determine, e.g., an estimated or measured battery charge from a regenerative braking operation due to a braking event along the portion of the roadway.

In another embodiment, the route database 230 may also store measured energy profiles for entire routes. For example, the hybrid vehicle 100 may frequently travel a same route, such as from a home to a workplace or from a home to a school. The route database 230 stores the route and energy measurements for the route e.g. the battery charge and discharge rates or increase and decrease in battery capacity. The route database 230 may also store time of day and type of day (weekend, weekday, holiday) that the measurements are made. The route database 230 may also store additional information on regenerative braking operations due to braking events along the route, such as number of braking events, torque generated during braking events, battery charge generated, etc.

Using the energy profile for a route, the location awareness module 120 is thus operable to determine, e.g., battery discharge amounts or rates for the route. The location awareness module 120 may also determine predicted regenerative braking operations for the route. The location awareness module 120 may thus determine an amount to discharge battery capacity (e.g., by engaging the EMG 140) prior to a measured regenerative braking operation along the route.

In another embodiment, the route database 230 is operable to communicate with other vehicles and receive actual power measurements or other types of measurements, such as speed measurements, braking sensor measurements, battery capacity measurements, regenerative braking operations, etc., from the other vehicles that have traveled a portion of the roadway. The location awareness module 120 is then operable to create an estimated energy profiles using the actual measurements of other vehicles as well.

The location awareness module 120 is thus able to generate an energy profile for a roadway portion or a route based on either an estimated energy profile or a measured energy profile for the roadway or route or a combination thereof.

Figure 3:
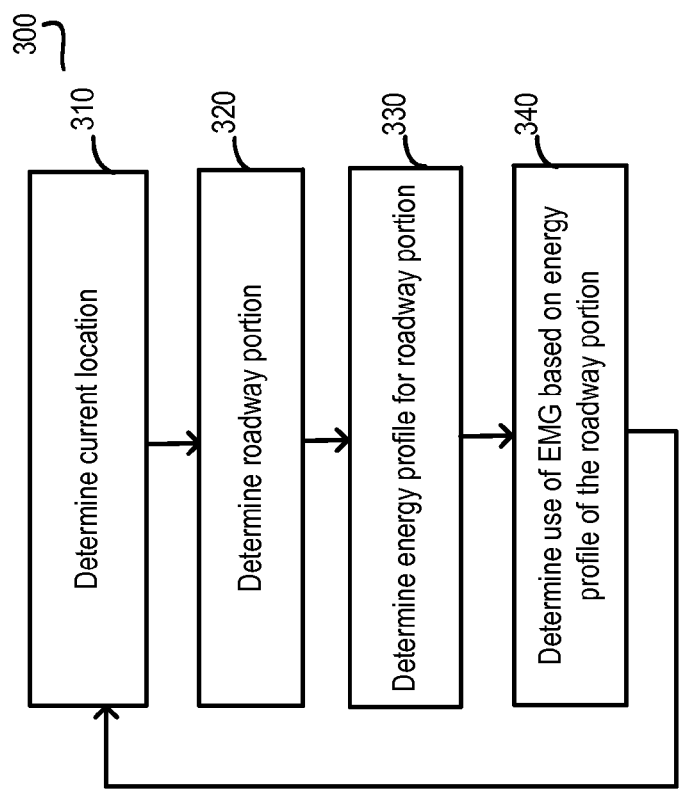
FIG. 3 illustrates a logical flow diagram of an embodiment of a method of operation of a hybrid vehicle with regenerative braking using location awareness.

FIG. 3 illustrates a logical flow diagram of an embodiment of a method 300 of operation of a hybrid vehicle 100 with regenerative braking using location awareness. The control module 150 or the location awareness module 120 or another processing module or a combination thereof may perform any of the functions described herein. In an embodiment, the location awareness module 120 determines a current location of the hybrid vehicle 100 from the location information module 200 in step 310. Based on a map of roadways from the map database 220, the current location of the hybrid vehicle 100, direction of movement of the hybrid vehicle 100 (e.g., from one or more of the vehicle sensors 124), a programmed route in a navigation system of the hybrid vehicle 100 and/or other information, the location awareness module 120 determines at least a portion of a roadway on which the hybrid vehicle 100 is traveling in step 320. A predictive route mapping algorithm may be utilized as well to determine the portion of the roadway that will be traveled by the hybrid vehicle 100. Minimally, when a route is unknown, the location awareness module 120 determines a roadway portion. The roadway portion includes at least a distance from the current location of the hybrid vehicle 100 to a next intersection in the roadway.

The location awareness module 120 then determines an energy profile for the portion of the roadway in step 330. The location awareness module 120 accesses the route database 230 to locate an energy profile for the roadway portion. Alternatively or if there is no energy profile stored already in the route database 230, the location awareness module 120 calculates the energy profile for the portion of the roadway. Based on the energy profile, use of the EMG 140 is determined for the portion of the roadway in step 340. This determination is described in more detail herein below with respect to FIG. 4. This process is then repeated for a next portion of a roadway being traveled by the hybrid vehicle 100. For example, once the hybrid vehicle passes an intersection or turns onto another roadway, the process 300 begins again to determine a current location and next roadway portion for the hybrid vehicle 100.

Figure 4:
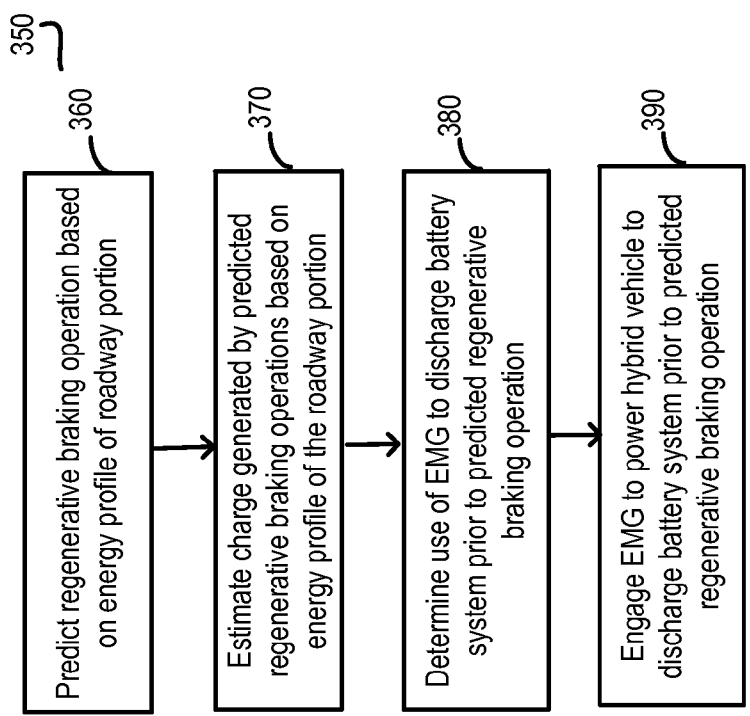
FIG. 4 illustrates a logical flow diagram of an embodiment of a method to determine use of an electric motor and generator to power the hybrid vehicle based on an energy profile.

FIG. 4 illustrates a logical flow diagram of an embodiment of a method 350 to determine use of the EMG 140 to power the hybrid vehicle based on an energy profile of a portion of a roadway. In step 360, the location awareness module 120 predicts one or more regenerative braking operations based on the energy profile for the roadway portion. The location awareness module 120 may also determine one or more predicted regenerative braking operations using current traffic conditions for the portion of the roadway from the traffic information module 210. Minimally, when a route is unknown, the location awareness module 120 predicts any possible regenerative braking operations over a distance to a next intersection in the roadway. So the portion of the roadway includes at least the current location of the hybrid vehicle 100 to a next intersection in the roadway. The location awareness module 120 then predicts whether any regenerative braking operations will occur for this portion of the roadway, e.g., based on the energy profile of the roadway, current traffic conditions, recent communications from other vehicles relating to regenerative braking operations along the portion of the roadway.

The energy profile for the roadway includes any actual measured regenerative braking operations and/or estimated regenerative braking operations for the portion of the roadway as well as any estimated or measured battery charge measurements for the corresponding regenerative braking operations. Using the energy profile, the location awareness module 120 determines an estimated charge from predicted regenerative braking operations along the roadway portion in step 370. Based on the estimated charge, the location awareness module 120 determines use of the EMG 140, e.g., a duration of use of the EMG needed to discharge the battery system prior to the predicted regenerative braking operation in step 380 and communicates this information to the control module 150. Alternatively, the control module 150 receives the estimated charge from predicted regenerative braking operations along the roadway portion and determines use of the EMG 140 needed to discharge the battery system prior to the predicted regenerative braking operation in step 380. The determination of the use EMG 140 needed to discharge the battery system 160 is based, e.g., on the estimated charge, current power capacity of the battery system 160, discharge rate of the battery system for current road conditions, etc. The control module 150 then engages the EMG 140 to power the hybrid vehicle 100 to discharge the battery system 160 prior to the predicted regenerative braking operation.

In another embodiment, step 380 is not performed. Instead, the control module 150 receives the estimated charge for a predicted regenerative braking operation and engages the EMG 140 at least until the battery capacity is at or below the estimated charge prior to the predicted regenerative braking operations. In an embodiment, the battery system 160 has a minimum battery capacity. The battery system will not discharge the battery system 160 lower than this minimum battery capacity. In this embodiment, the control module 150 engages the EMG 140 at least until the battery capacity is at or below the estimated charge or until the battery system 160 reaches the minimum battery capacity. In an embodiment, the control module 150 adjusts for unpredicted changes, such as unexpected braking events or accelerations or route changes along the roadway portion.

By providing location awareness, the location awareness module 120 helps the hybrid vehicle 100 to efficiently use the EMG 140 without overcharging or depleting the battery system 160. The hybrid vehicle 100 is thus able to more efficiently use the EMG 140 and regenerative braking operations to charge the battery system 160.

Figure 5:
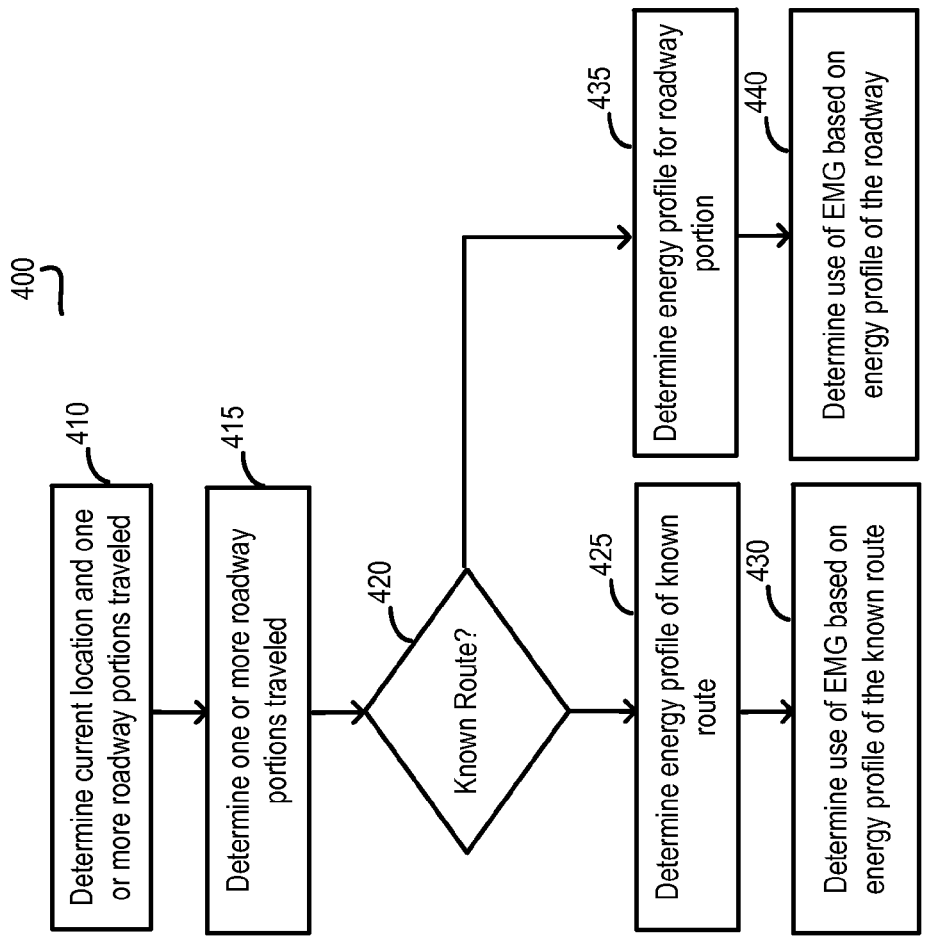
FIG. 5 illustrates a logical flow diagram of another embodiment of a method of operation of a hybrid vehicle with regenerative braking using location awareness.

FIG. 5 illustrates a logical flow diagram of another embodiment of a method 400 of operation of the hybrid vehicle 100 with regenerative braking using location awareness. In this embodiment, the hybrid vehicle 100 performs control of the regenerative braking operations based on a known route. For example, when route is known, the hybrid vehicle 100 may determine a more efficient use of the EMG 140 and regenerative braking operations in view of the entire route, rather than just to a next intersection in a roadway portion.

In an embodiment, the location awareness module 120 determines a current location of the hybrid vehicle in step 410 from the location information module 200. Based on a map of roadways from the map database 220, the current location of the hybrid vehicle 100, direction of movement of the hybrid vehicle 100 (e.g., from one or more of the vehicle sensors 124), previously or current programmed routes in a navigation system of the hybrid vehicle 100, time of day, type of day (weekend, weekday, holiday, etc.) and/or other information, the location awareness module 120 determines one or more portions of a roadway traveled by the hybrid vehicle 100 in step 415. Using a predictive route mapping algorithm, previously stored routes and the one or more portions of roadway previously traveled, the location awareness module 100 determines in step 420 whether the hybrid vehicle 100 is traveling a known route. In an example, the location awareness module 100 has stored an energy profile for a Known Route A (e.g. from home to work) that has been traveled between 8:00 am and 9:00 am on a plurality of weekdays. When the hybrid vehicle 100 begins at a current location of the starting point of Known Route A (e.g., home) and travels one or more portions of roadways along Known Route A between 8:00 am and 9:00 am on a weekday, the location awareness module 120 determines that the hybrid vehicle 100 is traveling the Known Route A (e.g., from home to work) stored in the route database 230 using a predictive mapping algorithm.

In addition, the location awareness module 120 determines a known route is being followed based on a programmed route in the navigation system of the hybrid vehicle 100. For example, an operator of the vehicle enters or selects a route beginning at a current location in a navigation system of the hybrid vehicle 100. The location awareness module 120 then determines the hybrid vehicle 100 is traveling a known route corresponding to the currently programmed route in the navigation system in step 420.

In addition, probability of route or next few miles or turns is predicted based on commonly traveled routes of other vehicles. Other vehicles communicate routes and/or energy profiles of routes to the hybrid vehicle 100. A navigation system or traffic service may also communicate routes with highest traffic rates, etc. These commonly traveled routes of other vehicles may be stored in route database 230 along with any associated energy profiles. Based on this information, current location of the hybrid vehicle 100, direction of movement of the hybrid vehicle 100, previous one or more roadway portions traveled by the hybrid vehicle 100, the location awareness module 120 then determines the hybrid vehicle 100 is traveling a known route corresponding to commonly traveled routes of other vehicles.

When the location awareness program 120 determines that the hybrid vehicle 100 is following a known route in step 420, the location awareness program 120 accesses the route database 230 and determines an energy profile for the known route in step 425. When the energy profile is not stored in the route database 230, the location awareness module 120 may calculate an estimated energy profile for the known route. Based on the energy profile, use of the EMG 140 and regenerative braking operations are determined for the known route in step 430. This determination is described in more detail herein below with respect to FIG. 6.

Referring back to step 420, when a route is unknown, the location awareness module 120 determines a roadway portion. The roadway portion includes at least a distance from the current location of the hybrid vehicle to a next intersection in the roadway. The location awareness module 120 then determines an energy profile for the portion of the roadway in step 435. The energy profile may be stored in the route database 230 or the location awareness module 120 may calculate the energy profile for the portion of the roadway. Based on the energy profile, use of the EMG 140 and regenerative braking operations are determined for the portion of the roadway in step 440.

Figure 6:
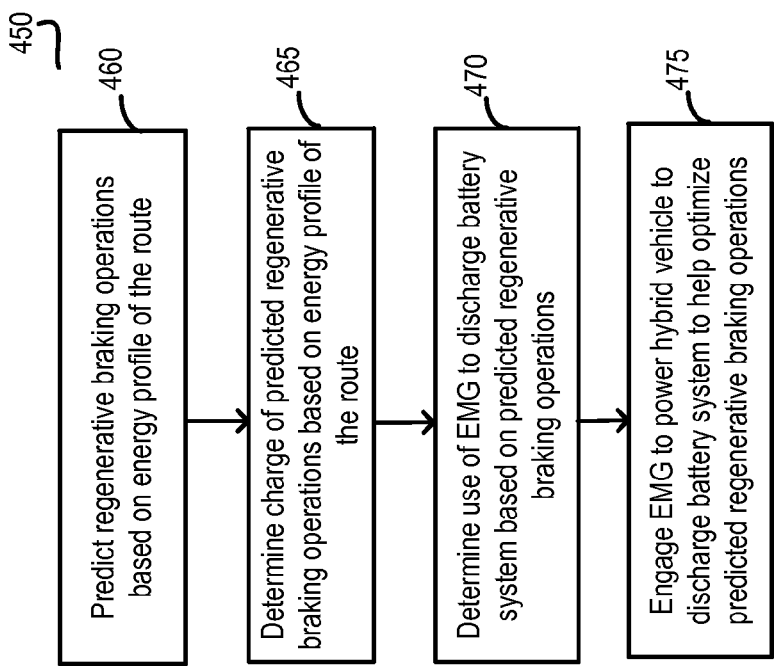
FIG. 6 illustrates a logical flow diagram of another embodiment of a method to determine use of an electric motor and generator to power the hybrid vehicle based on an energy profile.

FIG. 6 illustrates a logical flow diagram of another embodiment of a method to determine use of EMG 140 to power the hybrid vehicle based on an energy profile. In this embodiment, the hybrid vehicle 100 determines use of the EMG 140 to power the hybrid vehicle 100 based on an energy profile of a known route. In step 460, the location awareness module 120 predicts one or more regenerative braking operations based on the energy profile of the known route. The location awareness module 120 then determines an average charge or charge rate or other type of energy generation measurement from one or more of the predicted regenerative braking operations based on energy profile of the route in step 465. The hybrid vehicle 100 may then determine a more efficient use of the EMG 140 and regenerative braking operations in view of the average charge from the one or more of the predicted regenerative braking operations in step 470. For example, the location awareness module 120 determines using the energy profile that the known route includes two predicted regenerative braking operations in two different roadway portions near the end of the route. The hybrid vehicle 100 thus determines to use the EMG 140 prior to the two different roadway portions near the end of the route.

In step 475, the EMG is engaged to power the hybrid vehicle to discharge the battery system to help optimize charge expected from one or more of the predicted regenerative braking operations in the route. In an embodiment, the EMG 140 is engaged until the battery capacity is at or below a level able to accept the average charge of the one or more predicted regenerative braking operations in the route. For example, based on the average charge generated from the two predicted regenerative braking operations near the end of the route, the location awareness module 120 engages the EMG 140 to power the hybrid vehicle for one or more portions of the roadway near the start of the route prior to the two predicted regenerative braking operations near the end of the route.

Figure 7:
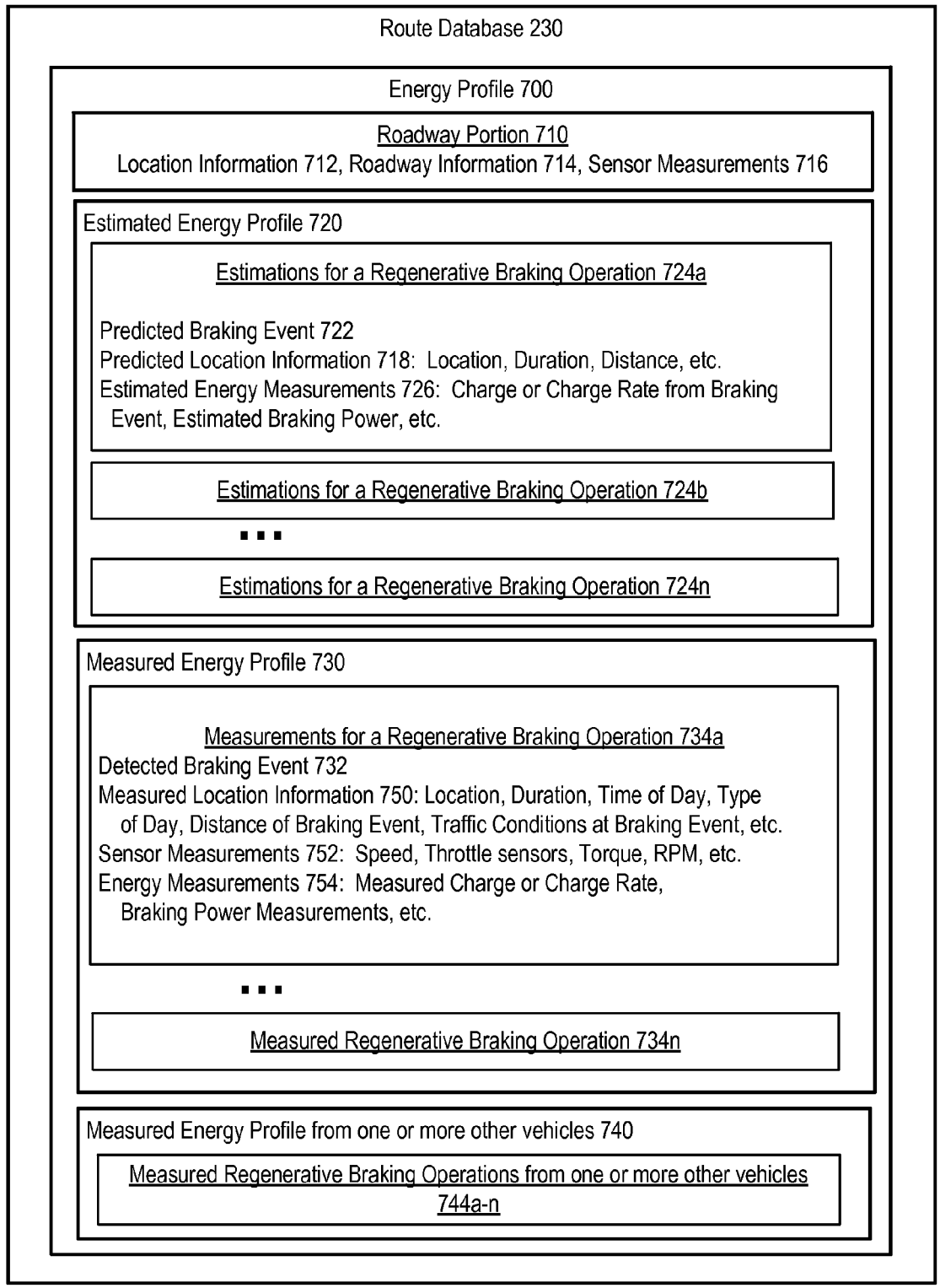
FIG. 7 illustrates a schematic block diagram of an embodiment of an energy profile.

FIG. 7 illustrates a schematic block diagram of an embodiment of an energy profile 700 stored in the route database 230. The energy profile 700 in this embodiment is for a roadway portion 710. The energy profile 700 includes location information of the roadway portion 710 such as a starting point and ending point of the roadway portion and an identification of the roadway, e.g. I-35, Highway 66, etc. The energy profile 710 also includes roadway information for the roadway portion 710, such as posted speed, topology information, intersections, stop lights, stop signs, speed bumps, etc. The energy profile 700 also includes sensor measurements 716 measured during previous travels along the roadway portion 710 by the hybrid vehicle 100. The sensor measurements 716 include, e.g., speed, torque, RPM, battery charge, battery discharge, etc.

The energy profile 700 includes one or more of an estimated energy profile 720, measured energy profile 730, and measured energy profile from one or more other vehicles 740. The estimated energy profile 720 includes estimations for regenerative braking operations 724*a-n* calculated from roadway information 712 for the roadway portion 710. In an embodiment, the location awareness module 120 determines one or more predicted braking events 722. For a predicted braking event 722, the location awareness module 120 determines an estimation for a regenerative braking operation 724 during the predicted braking event 722 and stores the estimations for the regenerative braking operation 724 in the energy profile 700. For example, the roadway portion 710 may include a stop sign, and the location awareness module 120 estimates various factors relating to the predicted braking event 722 at the stop sign and stores them in the estimated energy profile 720.

The estimations for a regenerative braking operation 724 for a predicted braking event 722 includes location information 718 for the predicted braking event 722, e.g., location along the roadway portion, duration and distance of the predicted braking event 722. The estimations for the regenerative braking operation 724 may also include estimated energy measurements 726, such as an estimated charge or charge rate from the braking event and/or estimated braking power needed during the braking event, such as torque, revolutions per minute (RPM) of the generator, deceleration rate, etc.

The energy profile 700 may also include a measured energy profile 730 that includes measurements for one or more regenerative braking operations 734*a-n* for detected braking events 732. In an embodiment, when the hybrid vehicle 100 has traveled the roadway portion 710, it stores measurements for one or more detected braking events 732 along the roadway portion 710 in the measured energy profile 730. The measurements for a regenerative braking operation 734 for a detected braking event 732 includes measured location information 750 for the detected braking event 732, e.g., location of the braking event, duration and distance of the detected braking event 732 as well as time of day, type of day, traffic conditions at the time of the braking event, etc. Various sensor measurements 752 may also be stored that are measured during the detected braking event 732, such as speed, throttle sensors, torque, RPM, deceleration rate, etc. The location awareness module 120 also stores energy measurements 754, such as a measured charge or charge rate from the detected braking event 732 and/or a braking power measurements measured during the detected braking event 732, such as torque, revolutions per minute (RPM) of the generator, deceleration rate, etc.

The energy profile 700 may also include a measured energy profile from one or more other vehicles 740. In an embodiment, hybrid vehicle 100 is operable to communicate with other vehicles or with a central communication system that communicates with a plurality of hybrid vehicles. The central communication system may be a navigation system or a car manufacturer service or other type of service or system. The hybrid vehicle 100 is thus able to receive measured energy profiles from one or more other vehicles 740 for roadway portion 710. The measured energy profile from the one or more other vehicles 740 includes measured regenerative braking operations 744*a-n* detected by the one or more other vehicles. These energy profile 740 and measurements therein are similar to those described above with respect to the measured energy profile 730.

Figure 8:
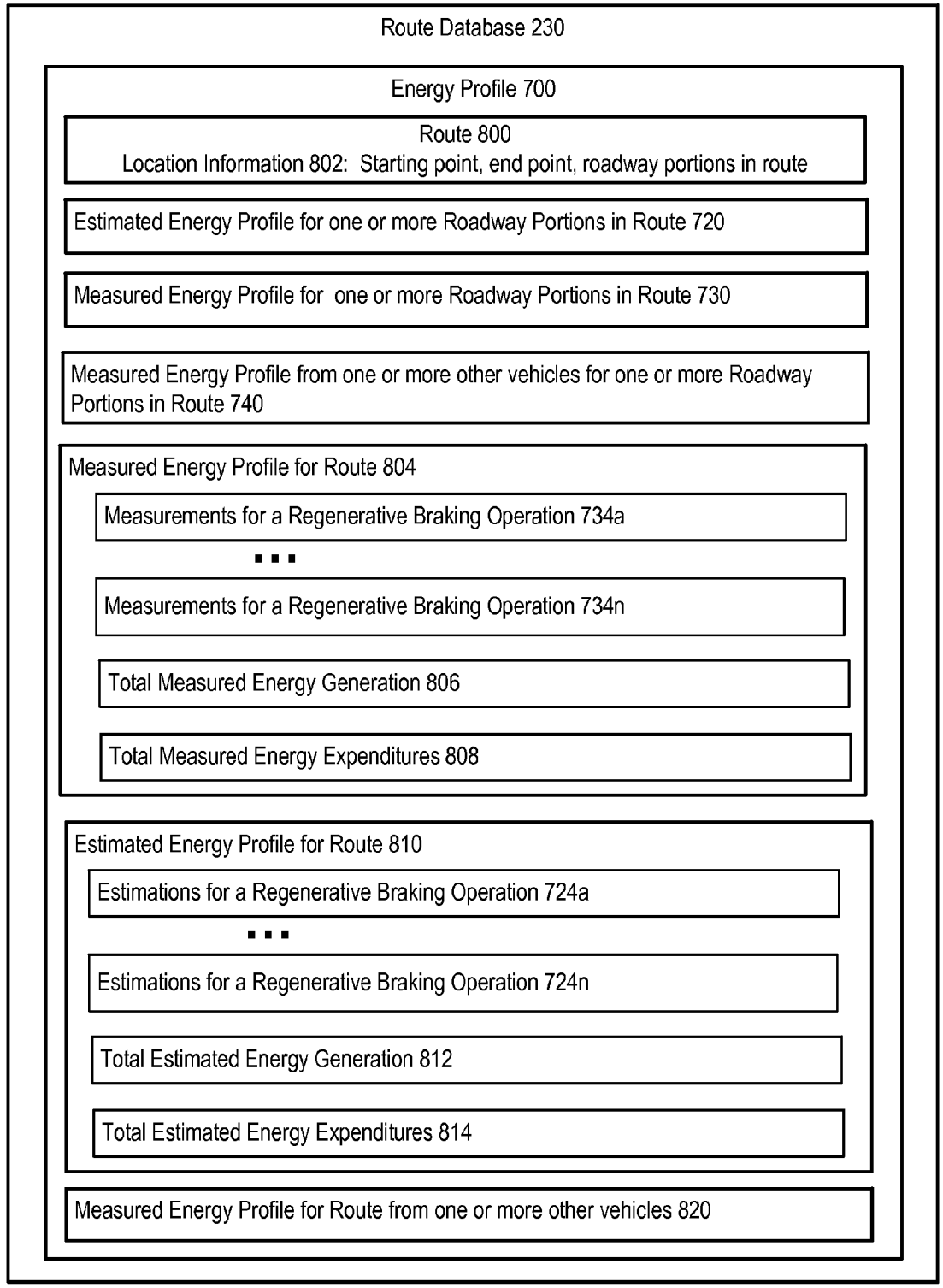
FIG. 8 illustrates a schematic block diagram of another embodiment of an energy profile.

FIG. 8 illustrates a schematic block diagram of another embodiment of an energy profile 700 stored in the route database 230. The energy profile 700 in this embodiment is for a route 800. The energy profile 700 includes location information 802 for the route, such as a starting point and ending point of the route and one or more roadway portions along the route, intersections along the route, directions along the route, etc. For one or more roadway portions along the route 800, the energy profile 700 may include similar energy profiles as in FIG. 7. For example, the energy profile 700 includes an estimated energy profile 720, measured energy profile 730 and measured energy profile from one or more other vehicles 740 for one or more roadway portions along the route 800.

When the hybrid vehicle 100 has traveled the route 800, the energy profile 700 also includes a measured energy profile for the route 804. The measured energy profile for the route 804 includes one or more measurements for a regenerative braking operation 734*a-n*. These measurements are similar to the measurements 734*a-n* described above with respect to a roadway portion in FIG. 7. In addition, the location awareness module 120 may also store total measured energy generation 806 for the route and total measured energy expenditures 808. These measurements may include for the route, total battery charge, total battery discharge, average torque, average RPM, etc.

The hybrid vehicle 100 may also calculate an estimated energy profile for the route 810 based on energy profiles for one or more roadway portions in the route, roadway information for the route, etc. This estimated energy profile for the route 810 includes one or more estimations for a regenerative braking operation 724*a-n*. These estimations are similar to those estimations 724*a-n* described above with respect to a roadway portion in FIG. 7. In addition, the location awareness module 120 may also calculate a total estimated energy generation 812 for the route, such as total charge or average charge rate and a total estimated energy expenditure 814 for the route, such as total battery discharge, average discharge rate, fuel consumed, fuel mileage rate, etc.

The energy profile 700 may also include a measured energy profile for the route from one or more other vehicles 820. For example, when one or more other vehicles have traveled the same route, the location awareness module 120 may request and receive information from the other vehicles about the route 800. This information may include measured energy profiles for the route 800, wherein the measured energy profiles for the route from the one or more other vehicles includes measurements similar to those detected and stored by the hybrid vehicle 100 in the measured energy profile for the route 804.

To determine an energy profile, the location awareness module 120 uses the stored energy profiles 700 as well as current road conditions. Current road conditions include current traffic information, weather information, accident information, road work information or other information about the condition of the roadway. The location awareness module 120 determines the energy profile using the energy profile stored in the route database 230 and the current road conditions.

FIG. 9 illustrates a logic flow diagram of an embodiment of a method 900 for determining an energy profile for a roadway portion. In step 910, the location awareness module 120 accesses the route database 230 to locate any stored energy profiles 700 for the roadway portion 710. The location awareness module 120 in step 915 searches the stored energy profile 700 for one or more measured regenerative braking operations 734 from the measured energy profile 730 for the roadway portion recorded with similar current road conditions, time of day, type of day, etc.

When no measured regenerative braking operations 734 are stored in the energy profile 700, the location awareness module 120 in step 920 searches the stored energy profile 700 for one or more estimated regenerative braking operations 724 from the estimated energy profile 720. The location awareness module 120 may also calculate the estimated energy profile 720 if one is not found in the energy profile 700. The location awareness module 120 may determine energy measurements for one or more predicted regenerative braking operations using the stored or calculated estimated energy profile 720 and/or using current road conditions, time of day, type of day, etc.

The location awareness module 120 in step 925 also searches the stored energy profile 700 for one or more measured regenerative braking operations from one or more other vehicles 744. In an embodiment in step 925, the hybrid vehicle 100 also attempts to communicate with other vehicles currently on the roadway portion or having recently traveled the roadway portion (e.g., within the last 5, 10, 20, 30 minutes or other predetermined time limit) or with a central communication system that communicates with other hybrid vehicles. The hybrid vehicle 100 requests information for one or more measured regenerative braking operations or other energy measurements recorded by the one or more other hybrid vehicles for the roadway portion within the predetermined time limit. Other methods or systems for obtaining information about the roadway portion through crowdsourcing may be implemented as well.

The hybrid vehicle 100 thus receives relatively current measurements on regenerative braking operations from other hybrid vehicles that have a probably chance of being recorded with similar road and traffic conditions. In an embodiment, the hybrid vehicle 100 requests information on type of hybrid vehicle and time of recordation of measurements. For example, if the hybrid vehicle 100 is a Toyota Prius®, the hybrid vehicle 100 would prefer to use relatively current measurements (e.g., within the predetermined time limit) on regenerative braking operations recorded by another Toyota Prius®.

In step 930, the location awareness module 120 extrapolates the energy profile for the roadway portion from the one or more measured and estimated energy profiles 720, 730, 740. The location awareness module 120 determines measurements of one or more regenerative braking operations from the one or more measured and estimated energy profiles 720, 730, 740 and may also adjust these measurements based on current road conditions, unexpected changes detected by the plurality of vehicle sensors 124*a-n*, time of day, type of day, etc. For example, the hybrid vehicle 100 may have an unexpected braking event due to a car wreck, unexpected obstacle in the road, etc.

When the energy profile for the roadway portion is determined, the location awareness module 120 provides the energy profile to the location awareness module 120. The location awareness module uses the energy profile for the roadway portion to determine the relative use of the internal combustion engine 130, the EMG 140 and regenerative braking operations as described above with respect to FIGS. 3 and 4.

FIG. 10 illustrates a logic flow diagram of an embodiment of a method 950 for determining an energy profile 700 for a route 800. In step 955, the location awareness module 950 accesses route database 230 to locate a stored energy profile 700 for a route 800. In step 960, the location awareness module 120 may generate an energy profile 700 for the route 800 based on one or more measured or estimated energy profiles 720, 730, 740 associated with one or more roadway portions 710 incorporated in the route 800. The location awareness module 120 estimates one or more measurements for regenerative braking operations 724*a-n* from an estimated energy profile of the route 810. The location awareness module 120 also determines one or more measurements for total estimated energy generation 812 and total measured energy expenditures 814 in the estimated energy profile for the known route 810.

In step 965, the location awareness module 120 determines one or more measurements for regenerative braking operations 734*a-n* from a measured energy profile of the route 804 with similar road conditions, time of day, type of day, etc. The location awareness module 120 also determines one or more measurements for total measured energy generation 806 and total measured energy expenditures 808 in the measured energy profile for the known route 804.

The location awareness module 120 in step 970 also searches the energy profile 700 for one or more measured regenerative braking operations from one or more other vehicles 744 that have traveled the route 800. In an embodiment in step 970, the hybrid vehicle 100 also attempts to communicate with other vehicles currently on a roadway portion of the route or having recently traveled a roadway portion of the route or recently traveled the entire route (e.g., within the last 5, 10, 20, 30 minutes or other predetermined time limit). Alternatively, the hybrid vehicle may communicate with a central communication system that communicates with other hybrid vehicles to determine more information about the route. The hybrid vehicle 100 requests information for the route, such as one or more measured regenerative braking operations or other energy measurements recorded by the one or more other hybrid vehicles for the route or roadway portions of the route within the predetermined time limit. Other methods or systems for obtaining information about the route through crowdsourcing may be implemented as well.

The hybrid vehicle 100 thus receives relatively current measurements on regenerative braking operations from other hybrid vehicles. Since these measurements were recorded within a predetermine time limit (such as within the last 5, 10, 20, 30 minutes), these measurements are probably recorded with similar road conditions. In an embodiment, the hybrid vehicle 100 requests information on type of hybrid vehicle and time of recordation of the measurements as well. For example, if the hybrid vehicle 100 is a Toyota Prius®, the hybrid vehicle 100 would prefer to use relatively current measurements (e.g., within the predetermined time limit) on regenerative braking operations recorded by another Toyota Prius®.

The location awareness module 120 extrapolates an energy profile 700 for the route 800 from the one or more measured and estimated energy profiles 804, 810, 820. The location awareness module 120 determines measurements of one or more regenerative braking operations from the one or more measured and estimated energy profiles 804, 810, 820 and may also adjust these measurements based on current traffic conditions, road conditions, unexpected changes detected by the plurality of vehicle sensors 124a-n, etc. For example, the hybrid vehicle 100 may have an unexpected braking event due to a car wreck, unexpected obstacle in the road, etc. The hybrid vehicle 100 may have an unexpected change in the route, such as an unexpected turn or stop (such as a gas station, etc.).

When the energy profile for the route is determined, the location awareness module 120 provides the energy profile to the location awareness module 120. The location awareness module uses the energy profile for the route to determine the relative use of the internal combustion engine 130, EMG 140 and regenerative braking as described above with respect to FIGS. 5 and 6.

Figure 11:
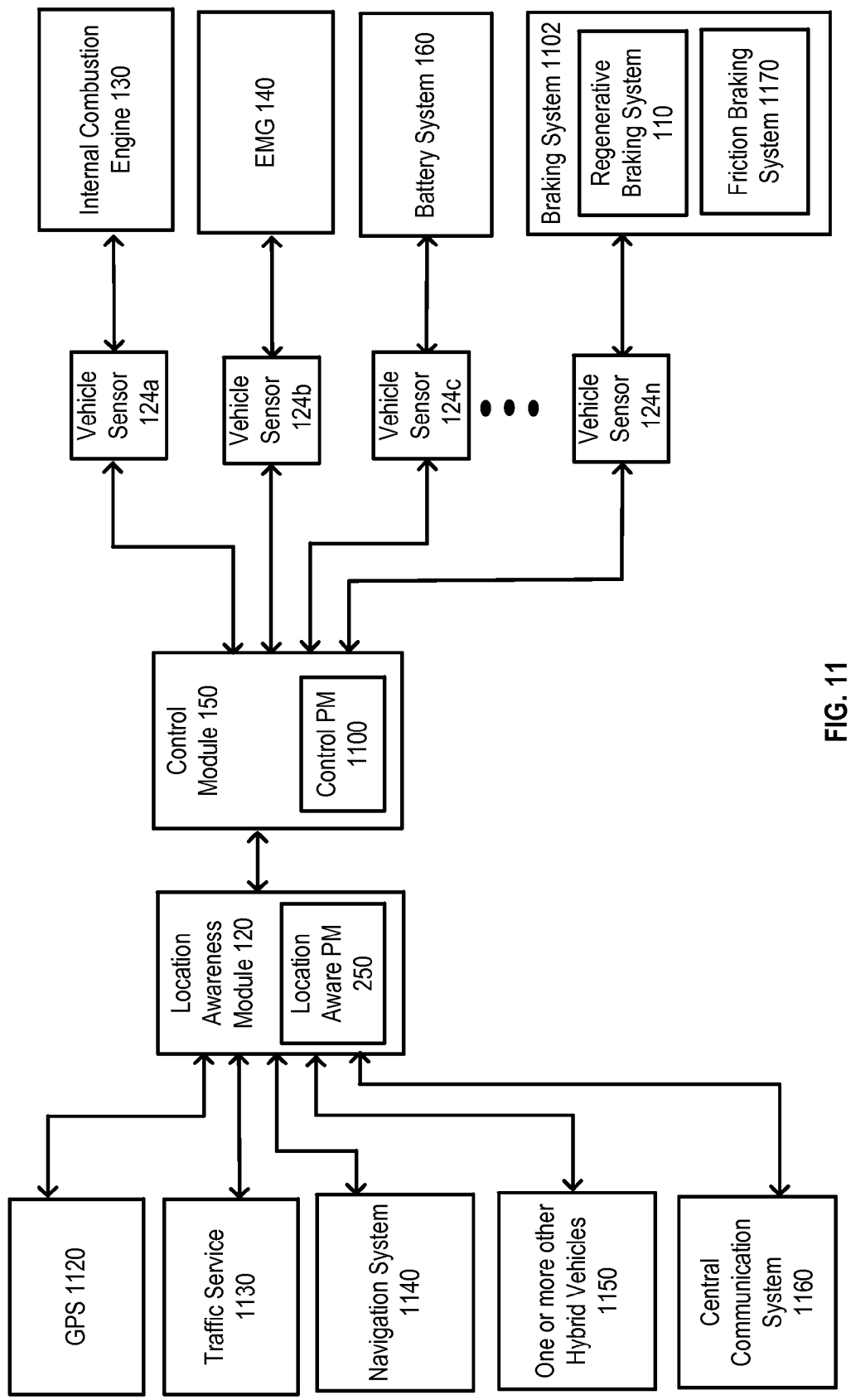
FIG. 11 illustrates a schematic block diagram of another embodiment of a hybrid vehicle with a location awareness module.

FIG. 11 illustrates a schematic block diagram of another embodiment of a hybrid vehicle 100 with a location awareness module 120. The control module 150 includes a control processing module (PM) 1100. The control processing module (PM) 1100 is operable to process or perform one or more functions described herein for the control module 150. In another embodiment, the control module PM 1100 processes or performs one or more functions described herein for the location awareness module 120. In another embodiment, a combination of the location awareness module 120 and the control module 150 processes or performs one or more functions described herein for the location awareness module 120 or the control module 150. Similarly, the location awareness module 120 may perform one or more functions described herein for the control module 150. In another embodiment, one or more other modules, internal or external to the hybrid vehicle 100, may perform one or more functions described herein as performed by the location awareness module 120 and/or the control module 150.

The control module 150 is coupled or interconnected to a plurality of vehicle sensors 124a-n. The vehicle sensors 124a-n measure operation of the hybrid vehicle 100. In an embodiment, the vehicle sensors 124a-n are coupled or interconnected to a plurality of systems and components of the hybrid vehicle 100, including, e.g. internal combustion engine 130, EMG 140, battery system 160 and braking system 1102. Braking system 110 includes regenerative braking system 110 and friction braking system 1170. Regenerative braking system 110 may also be included as part of EMG 140. The location awareness module 120 is coupled directly or indirectly to the vehicle sensors 124a-n to receive measurements of operation of the hybrid vehicle. In an embodiment, the location awareness module 120 receives one or more sensor measurements indirectly through the control module 150 or from other components or modules while in another embodiment, the location awareness module 120 receives one or more of the sensor measurements directly from one or more of the plurality of vehicle sensors 124a-n.

The location awareness module 120 is operable to communicate with one or more services or systems, such as global positioning service 1120, traffic service 1130, navigation system 1140. In an embodiment, the location awareness module is operable to communicate with one or more other vehicles 1150 or with a central communication system 1160 that communicates with a plurality of vehicles. The central communication system 1160 may be a navigation system or a car manufacturer service, etc. In an embodiment, the location awareness module 120 is operable to directly communicate with one or more services or systems 1120-1160 while in another embodiment, the location awareness module 120 communicates indirectly with the one or more systems or services 1120-1160 through the control module 150 or another communication interface.

The hybrid vehicle 100 determines an energy profile for a portion of a roadway or for a known route. The energy profile includes one or more measurements of regenerative braking operations for predicted braking events. The hybrid vehicle 100 determines a more efficient use of the EMG 140 based on the energy profile of the roadway portion or the route. For example, when the energy profile includes a predicted braking event, the hybrid vehicle 100 determines to engage the EMG 140 to discharge the battery system prior to the regenerative braking operation for the predicted braking event. When a route is known, e.g. from a home to work or from a home to a school is known, the hybrid vehicle may determine a more efficient relative use of the internal combustion engine 130, EMG 140 and regenerative braking operations in view of the entire route, rather than just to a next intersection in a roadway portion.

Embodiments described herein have many advantages. For example, increasing the regenerative braking operation reduces wear on friction wheel brakes. In addition, increased battery recharging through additional regenerative braking operations leads to increased use of the EMG 140. This leads to decreased vehicle emissions due to decrease in emissions of the ICE 130. It also leads to decrease use and cost of electricity from any type of plug-in recharging of the battery system 160.

The term "module" is used in the description of one or more of the embodiments of elements herein. A module includes one or more processing devices and/or one or more non-transitory memory devices operable to perform one or more functions as may be described herein. A module may operate independently and/or in conjunction with other modules and may utilize the processing device and/or memory of other modules and/or operational instructions of other modules. As also used herein, a module may contain one or more sub-modules, each of which may be one or more modules. A processing device includes a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The non-transitory memory device may be an internal memory or an external memory, and the memory may be a single memory device or a plurality of memory devices. The non-transitory memory device may be a read-only memory, random access memory, volatile memory, non-volatile memory, static memory, dynamic memory, flash memory, cache memory, and/or any non-transitory memory device that stores digital information. The various modules may implement one or more of its functions via a state machine, analog circuitry, digital circuitry, and/or logic circuitry. The non-transitory memory device may be embedded within, or external to, the circuitry comprising the state machine, analog circuitry, digital circuitry, and/or logic circuitry. The various modules may execute hard-coded and/or software and/or operational instructions stored by an internal or external non-transitory memory device to perform the steps and/or functions described herein.

As may be used herein, the term "operable to" or "configurable to" indicates that an element includes one or more of modules, data, input(s), output(s), etc., to perform one or more of the described or necessary corresponding functions and may further include inferred coupling to one or more other items to perform the described or necessary corresponding functions. As may also be used herein, the term(s) "coupled", "coupled to", "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, network element, etc.). As may further be used herein, inferred connections (i.e., where one element is connected to another element by inference) includes direct and indirect connection between two items in the same manner as "connected to".

Embodiments have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope of the claimed invention. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

What is claimed is:

1. A hybrid vehicle, comprising:
an internal combustion engine;
an electric motor and generator powered by a battery system, wherein the electric motor and generator is operable to perform a regenerative braking operation to recharge the battery system;
at least one processing module configured to:
determine a route of the hybrid vehicle and an energy profile for the route;
determine a first predicted regenerative braking operation using the energy profile for the route;
estimate a first charge to be generated by the first predicted regenerative braking operation using the energy profile for the route;
determine a first duration of operation of the electric motor and generator to discharge the battery system based on the first estimated charge; and
engage the electric motor and generator to power the hybrid vehicle for the first determined duration prior to the predicted regenerative braking operation on the route.

2. The hybrid vehicle of claim 1, wherein the at least one processing module is further configured to:
determine a second predicted regenerative braking operation using the energy profile for the route;
estimate a second charge to be generated by the second predicted regenerative braking operation using the energy profile for the route; and
determine a second duration of use of the electric motor and generator based on the second estimated charge and engage the electric motor and generator to power the hybrid vehicle for the second determined duration prior to the second predicted regenerative braking operation along the route.

3. The hybrid vehicle of claim 1, wherein the at least one processing module is further configured to:
engage the electric motor and generator to power the hybrid vehicle and to discharge the battery system in an amount equal to or more than the second estimated charge prior to the second predicted regenerative braking operation.

4. The hybrid vehicle of claim 1, wherein the at least one processing module is configured to determine the first predicted regenerative braking operation using the energy profile for the route by:
accessing a measured energy profile of the route, wherein the measured energy profile of the route includes energy measurements for the first predicted regenerative braking operation and location information for one or more detected braking events corresponding to the first predicted regenerative braking operation.

5. The hybrid vehicle of claim 1, wherein the at least one processing module is configured to determine the first predicted regenerative braking operation using the energy profile for the route by:
accessing an estimated energy profile of the route, wherein the estimated energy profile of the route includes location information for one or more predicted braking events and estimated energy measurements for the one or more predicted braking events corresponding to the first predicted regenerative braking operation.

6. The hybrid vehicle of claim 2, wherein the at least one processing module is configured to determine the first and second predicted regenerative braking operations using the energy profile for the route by:
determining one or more roadway portions along the route;
accessing energy profiles corresponding to the one or more roadway portions; and
determining the first and second predicted regenerative braking operations from the energy profiles corresponding to the one or more roadway portions.

7. The hybrid vehicle of claim 1, wherein the at least one processing module is further configured to determine a total measured energy generation and a total measured energy expenditures for the route from the energy profile for the route.

8. A method for controlling a hybrid vehicle, comprising:
powering an electric motor and generator by a battery system;
recharging the battery system using a regenerative braking operation by the electric motor and generator;
determining a relative use of the electric motor and generator and an internal combustion engine to power the hybrid vehicle by:
determining a roadway portion being traveled by the hybrid vehicle and an energy profile for the roadway portion;

determining a predicted regenerative braking operation along the roadway portion and estimating a charge to be generated by the predicted regenerative braking operation using the energy profile; and determining a duration of use of the electric motor and generator to discharge the battery system based on the estimated charge.

9. The method of claim 8, further comprising:

engaging the electric motor and generator to power the hybrid vehicle prior to the predicted regenerative braking operation to discharge the battery system in an amount equal to or more than the estimated charge when a capacity of the battery system is at or above a maximum predetermined threshold of capacity.

10. The method of claim 8, wherein determining a predicted regenerative braking operation along the roadway portion using the energy profile, further comprises:

accessing a measured energy profile of the roadway portion, wherein the measured energy profile of the roadway portion includes measured location information for a detected braking event and energy measurements for a regenerative braking operation during the detected braking event.

11. The method of claim 8, wherein determining a predicted regenerative braking operation along the roadway portion using the energy profile, further comprises:

accessing an estimated energy profile of the roadway portion, wherein the estimated energy profile of the roadway portion includes location information for a predicted braking event and estimated energy measurements for a regenerative braking operation during the predicted braking event.

12. The method of claim 8, wherein determining a predicted regenerative braking operation along the roadway portion using the energy profile, further comprises:

accessing a measured energy profile of the roadway portion from one or more other vehicles, wherein the measured energy profile includes location information for a detected braking event and energy measurements for a regenerative braking operation during the detected braking event from the one or more other vehicles.

* * * * *